(12) United States Patent  (10) Patent No.: US 8,820,833 B2
Tsuchiya et al.  (45) Date of Patent: Sep. 2, 2014

(54) STRUCTURE OF TRIM COVER ASSEMBLY FOR SEAT BACK

(75) Inventors: Fumiaki Tsuchiya, Farmington Hills, MI (US); Michael Dwayne Welch, Farmington Hills, MI (US); Joseph Anthony Niemiec, Farmington Hills, MI (US)

(73) Assignee: Tachi-S Co., Ltd. (JP)

( * ) Notice: Subject to any disclaimer, the term of this patent is extended or adjusted under 35 U.S.C. 154(b) by 320 days.

(21) Appl. No.: 13/292,198

(22) Filed: Nov. 9, 2011

(65) Prior Publication Data

US 2013/0113241 A1  May 9, 2013

(51) Int. Cl.
*A47C 31/02* (2006.01)
*B60N 2/68* (2006.01)
*B60N 2/58* (2006.01)

(52) U.S. Cl.
CPC .............. *B60N 2/5825* (2013.01); *B60N 2/682* (2013.01)
USPC .................... 297/218.3; 297/228.13

(58) Field of Classification Search
USPC ................... 297/218.1–218.5, 228.13, 188.04
See application file for complete search history.

(56) References Cited

U.S. PATENT DOCUMENTS

| 4,047,756 | A | * | 9/1977 | Ney | 297/219.1 |
| 5,295,732 | A | | 3/1994 | Boisset | 297/452.1 |
| 5,803,539 | A | * | 9/1998 | Dewar et al. | 297/228.12 |
| 6,079,779 | A | * | 6/2000 | Tanaka et al. | 297/228.13 |
| 6,309,017 | B1 | * | 10/2001 | Middleton | 297/219.1 |
| 7,255,405 | B2 | * | 8/2007 | Kodera et al. | 297/452.62 |
| 7,588,290 | B2 | * | 9/2009 | Takezawa | 297/218.2 |
| 7,673,939 | B2 | * | 3/2010 | Taguchi et al. | 297/218.1 |
| 7,857,383 | B2 | * | 12/2010 | Nguyen et al. | 297/218.1 |
| 8,500,198 | B2 | * | 8/2013 | Sugiura et al. | 297/228.13 |
| 2002/0117882 | A1 | * | 8/2002 | Takezawa | 297/218.1 |

FOREIGN PATENT DOCUMENTS

JP  2001-008793 A  1/2001

* cited by examiner

*Primary Examiner* — David R Dunn
*Assistant Examiner* — Timothy J Brindley
(74) *Attorney, Agent, or Firm* — Ostrolenk Faber LLP

(57) ABSTRACT

On a rear side of seat back, a trim cover assembly of the seat back includes an openable first cover portion disposed centrally thereof and a pair of second cover portions disposed on opposite sides of the first cover portion. A pair of female fastener assemblies are provided to two lateral ends of the first cover portion, respectively, and each comprises: an anchor element; a female fastener element; and a connecting element connected between the anchor and female fastener elements. The anchor element is securely engaged with a seat back frame, thereby neatly securing the two lateral ends of the first cover to the rear side of seat back. The male fastener element is securely engaged with the female fastener element, thereby neatly securing the two second cover portions to the rear side of seat back in alignment with the two lateral ends of the first cover portion.

11 Claims, 5 Drawing Sheets

STRUCTURE OF TRIM COVER ASSEMBLY FOR SEAT BACK

BACKGROUND OF THE INVENTION

1. Field of the Invention

The present invention relates to a structure of trim cover assembly covering a seat back of automotive seat. In particular, the invention is directed to an arrangement of trim cover assembly which is suited for covering the seat back or more suited for covering a rear side of the seat back on which a pocket is provided.

2. Description of Prior Art

As understandable from FIG. 1, there is known a seat back (SB') of the type comprising a seat back frame (3) made of metallic material, a foam padding (4) and a trim cover assembly (1'), wherein a molding process has been effected to form the padding (4) into a predetermined configuration substantially conforming to an outer contour of seat back, with the seat back frame (3) integrally provided therein, and the trim cover assembly (1'), formed by sewing together plural cover materials into a three-dimensional shape, is securely attached on outer surfaces of the padding (4). Hence, it is to be seen that the trim cover assembly (1') covers substantially an entire outer surface of the foam padding (4).

In the rear side of the thus-formed padding (4), a flat support plate (6) is resiliently connected by springs (61) with the seat back frame (3) to thereby resiliently support the front region of the padding (4).

As shown, the trim cover assembly (1') per se is formed with an openable rear cover portion (11') in the rear side (1'A) thereof, such that the upper end of that rear cover portion (1'A) is only integral with the trim cover assembly (1'), while all other remaining ends thereof are not connected with the latter (1'). Formed in an approximately lower half of such openable rear cover portion (11') is a pocket (P) adapted for receiving books, leaflets or other small articles. Designations (12') denotes a pair of rear cover portions which are defined in the rear side of the trim cover assembly (1') as in FIG. 1 so as to be substantially equal in length to the openable rear cover portion (11') and spaced apart from each other a distance substantially equal to a breadth of that cover portion (11'). Hence, it is to be seen that, before assembly, the openable rear cover portion (11') is movable towards the two cover portions (12') and can be disposed therebetween to close and finish the rear side of the trim cover assembly (1').

In this conventional seat back, a pair of slide fasteners or zippers (11A) and (11A) are used to engage and disengage the openable rear cover portion (11') with and from the pair of rear cover portion (12') and (12'). As seen in FIG. 1, one zipper (11A) is fixedly connected between and along two first lateral ends respectively of the two different rear cover portions (11') and (12'), while the other zipper (11A) is likewise fixedly connected between and along two second lateral ends respectively of the two different rear cover portions (11') and (12').

This sort of seat-back trim cover assembly having an openable rear cover portion with zippers has been disclosed from the Japanese Laid-Open Patent Publication No. 2001-8793 (JP 2001-8793 A). According thereto, a three-dimensional trim cover assembly of seat back is provided, which has, formed in the rear side thereof, a rear cover portion similar to the afore-said openable rear cover portion (11'), so that a pair of slits are defined between that particular rear cover portion and two other rear cover portions of the trim cover assembly in the same manner as described above. A pair of zippers are provided between such rear cover portion and two other rear cover portions in the same manner as described above, to thereby allow that openable rear cover portion to be engaged and disengaged with and from the trim cover assembly. Hence, according to the above-described prior arts, in assembly of seat back, by raising such openable rear cover portion upwardly, the trim cover assembly can be opened wide to provide an opening sufficient to allow a foam padding to be bodily inserted therethrough and placed within the trim cover assembly, and after having placed the foam padding in the trim cover assembly, the openable rear cover portion can be releasably secured by the zippers to the rear side of the trim cover assembly, so that the trim cover assembly may be closed to cover substantially an entirety of foam padding. This effectively makes it easy to cover the padding with the trim cover assembly, thus increasing efficiency and rapidity for attaching a trim cover assembly on a foam padding to form a seat back.

However, the foregoing conventional structure of seat-back trim cover assembly with a pocket provided to the rear side thereof has been with the problem that, when a passenger strongly pulls the pocket (at P) or inserts a large book or a plurality of books or articles in that pocket, both openable rear cover portion (at 11') and two cover portions (at 12') engaged therewith via the zippers (at 11A) are forcibly pulled and expanded too much rearwardly from and inwardly of the rear side of the seat back, because of the corresponding excessive great force being applied thereto from the passenger, books or articles, with the result that the zipped portions (at 11A) are forcibly disengaged from each another and opened or deformed meanderingly or sinuously, which undesirably impairs an outer aesthetic appearance of the rear side of seat back.

SUMMARY OF THE INVENTION

In view of the above-stated drawbacks, it is a purpose of the present invention to provide an improved arrangement of trim cover assembly to a seat back, which insures to prevent the above-described deformation and disengagement at engaged regions among rear cover portions and also to avoid influence of the above-described exteriorly-applied great force to the rear side of trim cover assembly which is attached to a rear side of the seat back.

In order to achieve such purpose, in accordance with the present invention, there is basically provided an arrangement of trim cover assembly to a seat back, wherein the seat back includes a rear side facing backwardly thereof and comprises: a foam padding formed in a shape that substantially conforms to an outer contour of the seat back, the foam padding including a rear side corresponding to the rear side of the seat back; a seat back frame provided in the foam padding, the seat back frame including a pair of lateral frame portions; and the trim cover assembly which is formed in a three-dimensional shape that substantially conforms to the shape of the foam padding, the trim cover assembly covering the foam padding, wherein the trim cover assembly includes a rear side corresponding to the rear side of the seat back and also includes: a first cover portion defined in said rear side of the trim cover assembly, such that one end of the first cover portion is only integral with the rear side of the trim cover assembly so that the first cover portion is movable relative to the one end in a direction toward and away from the rear side of the foam padding, the first cover portion having a pair of lateral end regions; and a pair of second cover portions defined in the rear side of the trim cover assembly so as to be disposed symmetrically relative to the first cover portion, wherein one of the pair of second cover portions includes a free end region, while the other of the pair of second cover portions also includes a free end region, such that the two free end regions respectively of the pair of second cover portions are spaced apart from each other relative to the first cover portion, while facing toward each other and extending substantially along a whole length of both the pair of lateral frame portions of the seat back frame, wherein a pair of male fastener elements are respectively provided to and along the free end regions respectively of the pair of second cover portions, wherein a pair of female fastener assemblies are respectively provided to and along the two lateral end regions of the first cover portion, the pair of female fastener assemblies each including an anchor element and a female fastener element, and wherein the anchor element is securely engaged with and along each of the pair of lateral frame portions of the seat back frame, whereas the male fastener element is securely engaged with and along the female fastener element, so that the first cover portion is securely attached to the rear side of the foam padding, while the pair of second cover portions are also securely attached to the rear side of the foam padding, with the two free end regions respectively thereof adjoining with and along the two lateral end regions of the first cover portion, respectively.

As an exemplary mode of the present invention, the first cover portion may be provided with a pocket.

Preferably, the afore-said pair of male fastener elements may each be formed from a hard synthetic resin material which is amenable to sewing, and be connected by sewing to and along the free end regions respectively of the pair of second cover portions. Also, the afore-said pair of female fastener assemblies may be formed from a hard synthetic resin material amenable to sewing and be connected by sewing to and along the two lateral end regions of the first cover portion, respectively.

As one aspect of the present invention, the afore-said pair of lateral frame portions of the seat back frame may each be of a channel cross-section including a pair of flange portions which extend along the pair of lateral frame portions, respectively, wherein one of those two flange portions has a free end region. The afore-said anchor element be of such a configuration and property that allow the free end region of each of the pair of flange portions to be inserted therein and securely engaged therewith.

As another aspect of the present invention, the afore-said pair of male fastener elements may each comprise a male fastener plate fixedly provided to and along the free end region of each of said pair of second cover portions, and the female fastener element associated with each of the two female faster assemblies be of a generally "J" shaped cross-section having: a flat base portion; and a female engagement portion which extends curvilinearly in a hairpin fashion from one end of the flat base portion and further extend in a substantially parallel relation with the flat, base portion to terminate in a projected end portion which faces towards that flat base portion, while being spaced apart therefrom, whereupon the female fastener element has: an opening defined between the projected end portion and the flat base portion; and an inner space defined by the afore-said flat base portion, female engagement portion and projected end portion, wherein both of the free end region of second cover portion and the male fastener element provided therewith are inserted through the opening and securely engaged in the inner space, so that the pair of second cover portions are securely attached in position to the rear side of the foam padding, with the free end regions respectively thereof adjoining with and along the two lateral end regions of said first cover portion, respectively, with the flat base portion of female fastener element being in a close contact upon an outer surface of the rear side of foam padding.

As a still further aspect of the invention, the afore-said pair of female fastener assemblies may each include a securing base element to be securely engaged with one of said pair of lateral frame portions, the securing base element having, defined therein, a plate portion and said anchor element in an integral manner. Also, each of the female fastener assemblies may further include a connecting element, and the plate portion of securing base element and the female fastener element are connected together via the connecting element. Each of the securing base element, the female fastener element and the connecting element has a length substantially equal to a whole length of each of the pair of lateral frame portions.

As a yet another aspect of the invention, the rear side of the foam padding may include: an outer surface; and a region defined therein adjacent to each of the pair of lateral frame portions, and the two female fastener assemblies may each include a securing base element to be securely engaged with one of the pair of lateral frame portions, the securing base element having, defined therein, a plate portion and the anchor element in an integral manner, wherein such plate portion is in a close contact with the region of the rear side of the foam padding, and the two female fastener assemblies each further includes a connecting element having a first portion and a second portion. The first portion is connected with the plate portion of the securing base element, while being abutted against the region of the rear side of the foam padding, whereas the second portion is connected with the female fastener element, while being abutted against the outer surface of the rear side of the foam padding.

Other various features and advantages will become apparent from reading of the description, hereinafter, with reference to the accompanied drawings.

DETAILED DESCRIPTION OF PREFERRED EMBODIMENT OF THE INVENTION

Referring to FIGS. 2 to 7, there is illustrated one preferred mode of arrangement of trim cover assembly for seat back in accordance with the present invention.

Figure 3:
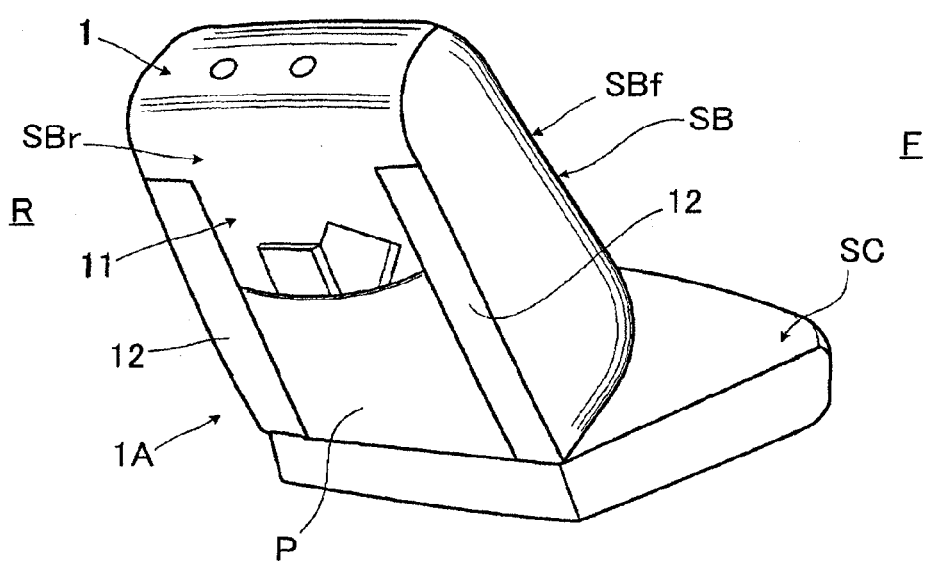
FIG. 3 is a schematic perspective view of a resulting seat back in accordance with the present invention, which shows a pocket provided on a rear side of the seat back, indicating an example where large books are received in the pocket.

FIG. 3 shows an automotive seat composed of: a seat cushion (SC); and a seat back (SB) having a pocket (P) provided on the rear side (SBr) thereof, wherein the pocket (P) is adapted for allowing items including books and maps to be received therein, and wherein the seat back (SB) is inclinable forwardly and backwardly relative to the seat cushion (SC) as known in the art, but constructed in a novel manner as will be described in accordance with the present invention. Designation (SBf) denotes a front side of the seat back (SB).

It is to be noted that the wording, "forward", "front" or "forwardly", refers to a forward side (F) facing forwardly of the seat or seat back, whereas the wording "backward", "rear" or "backwardly" refers to a backward side (R) facing backwardly of the seat or seat back.

Figure 1:
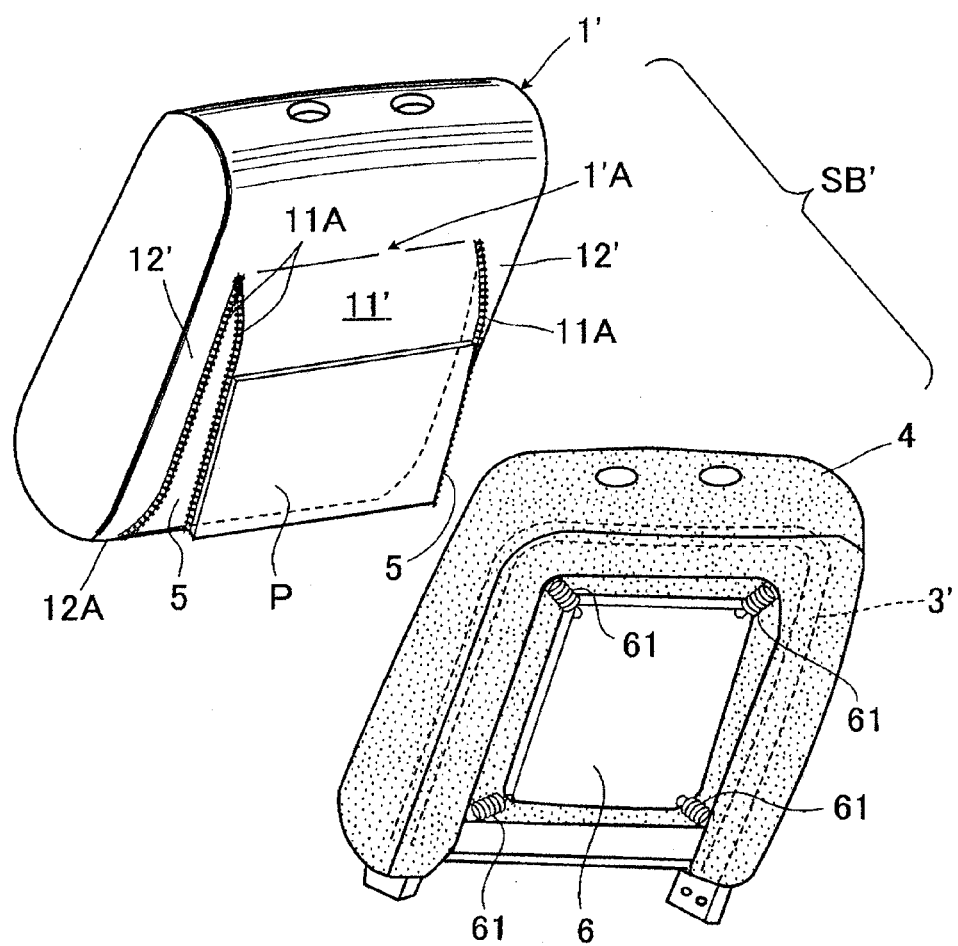
FIG. 1 is an exploded perspective view showing a known arrangement of trim cover assembly to seat back.
Figure 2:
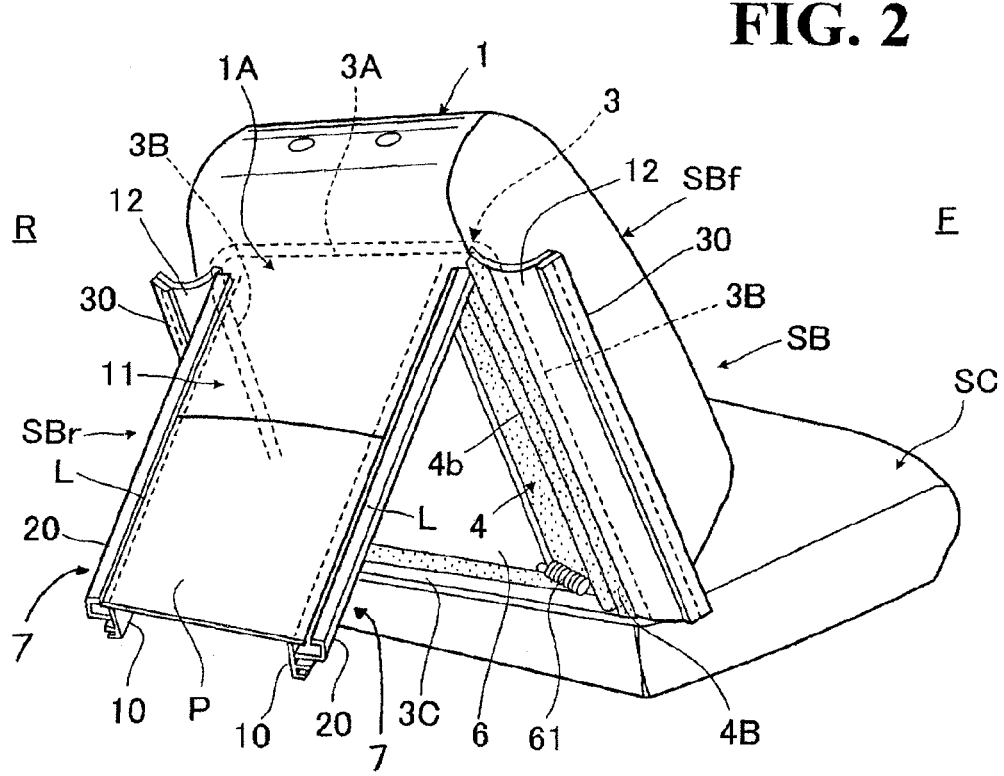
FIG. 2 is a schematic perspective view of a novel arrangement of trim cover assembly to seat back in accordance with the present invention, which shows a principal part arranged in the rear side of the seat back.

As seen in FIG. 2, in the seat back (SB) of the present invention, a seat back frame (3) of substantially rectangular configuration is provided and formed by an upper frame member (3A), a pair of lateral frame members (3B) and (3B), and a lower frame member (3C). In particular, as seen from FIG. 4, each of the two lateral frame members (3B) is of a known channel cross-section which has, defined therein: a first flange portion (3a) shown to face forwardly; a second flange portion (3b) shown to face backwardly, wherein those first and second flange portions (3a) and (3b) project in a direction inwardly of the seat back or foam padding (4); and a frame body portion (3c) defined between those two flange portions (3a) and (3b), the frame body portion (3c) being therefore shown to face laterally of the seat back.

Figure 4:
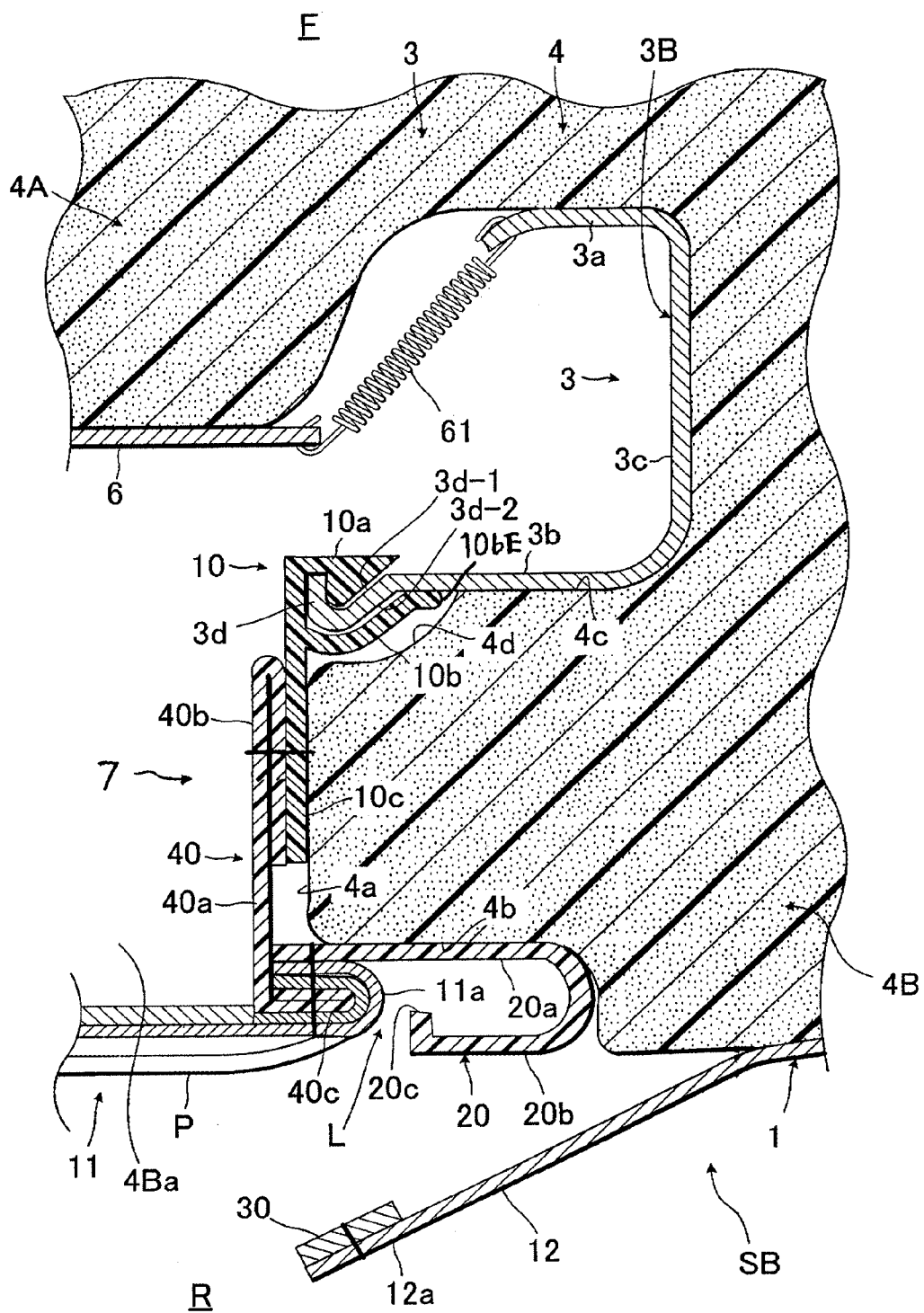
FIG. 4 is a fragmentary sectional view of a principal part of the present invention, which shows the state where a first rear cover portion is secured to the rear side of the seat back, prior to a second rear cover portion being secured thereto.
Figure 7:
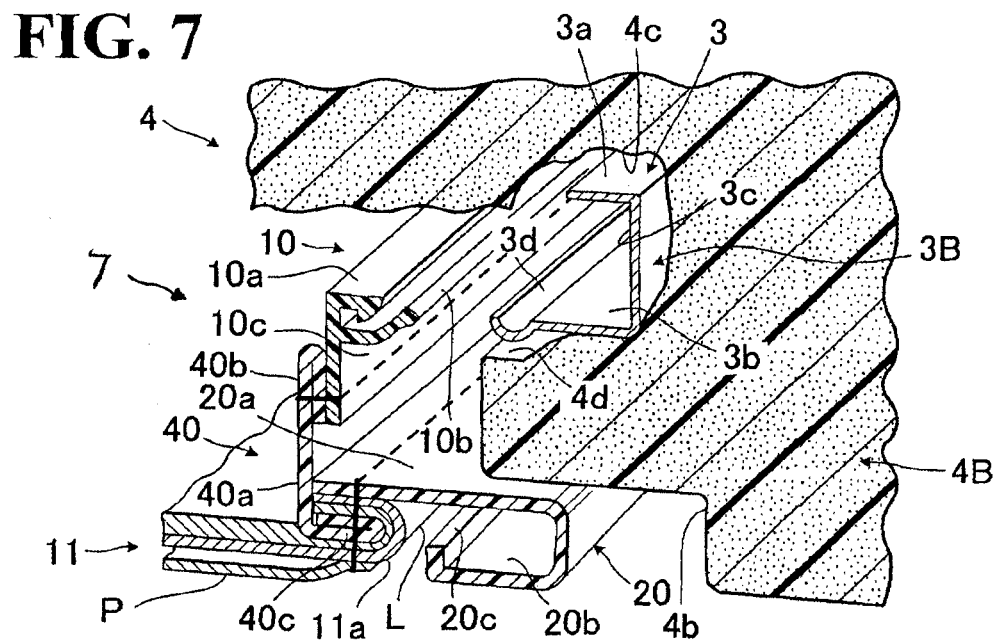
FIG. 7 is a perspective view fragmentary in part which shows a principal part of the invention.

In accordance with the present invention, as can be seen from FIGS. 4 and 7, each of the afore-said two lateral frame members (3B) is further formed with a gutter-like male engagement end portion in the second flange portions (3b) thereof. More specifically, such male engagement end portion is a hooked male engagement end portion (3d) of substantially U-shaped cross-section, as illustrated, which is engageable with an anchor element (at 10a and 10b), as will be elaborated later.

Figure 5:
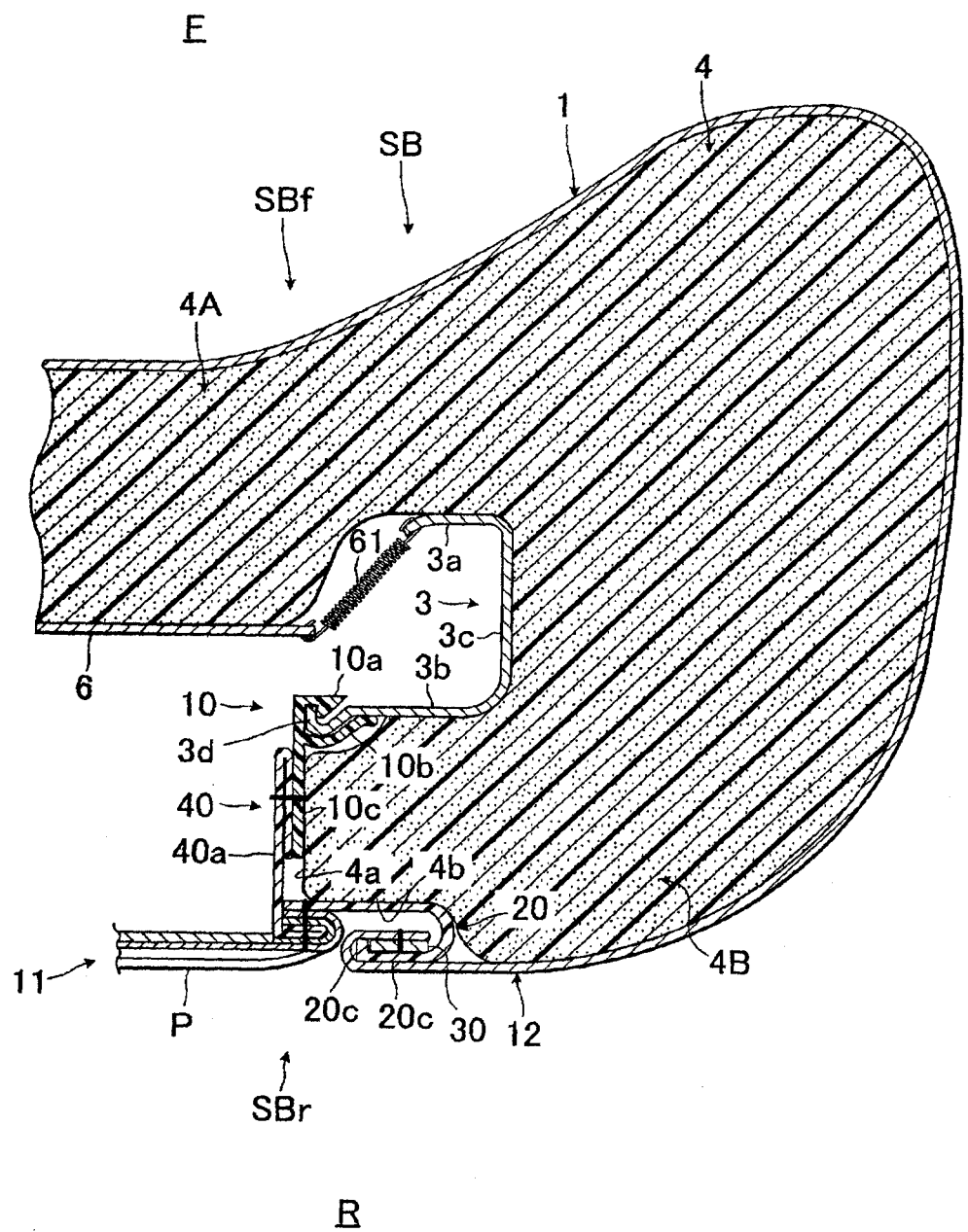
FIG. 5 is a partly broken sectional view of the seat back in accordance with the present invention, which shows the principal part and the state where the second rear cover portion is secured to the rear side of the seat back.

The foam padding (4) is formed in a shape that substantially conforms to a predetermined contour of seat back (SB). As seen in FIGS. 2 and 5, a front side (4A) of that foam padding (4) is so configured as to have a central padding region and a pair of side bolster padding regions, as known in the art, to properly support a back of seat occupant. On the other hand, a rear side (4B) of the foam padding (4) is so formed to define a recessed region (4Ba) in substantially a central area thereof, and a back support plate (6) is disposed and supported by springs (61) within that recessed region (4Ba) to resiliently support a back of seat occupant, as known in the art.

In accordance with the present invention, two inner lateral walls of the afore-said recessed region (4Ba) of the foam padding (4), which extend adjacent to and along the respective two lateral frame members (3B) and (3B), are substantially equal in length to those two particular lateral frame members (3B) and (3B), respectively. Further, as understandable from FIGS. 2 and 4, formed in such two inward lateral walls of recessed region (4Ba) are a pair of stepped portions (4b), respectively. More specifically, each stepped portion (4b) is defined in an outwardly or backwardly facing corner of each of the two inner lateral walls of the foam padding's recessed region (4Ba), such that a pair of stepped portions (4b) and (4b) are arranged on the foam padding's rear side (4B) in an opposedly facing and spaced-apart relation and extend to a length substantially equal to a whole length of each of the two lateral frame members (3B). In this regard, in FIG. 2, a right stepped portion (4b) is only depicted as being formed in the right inner lateral wall of the foam padding's recessed region (4Ba), while another left stepped portion, which is structurally same with that right stepped portion (4b), is concealed by a rear central cover portion 11 and not visible. But, it is to be understood that such left stepped portion is actually formed in the left inner lateral wall portion of the recessed portion (4B). Those two stepped portions (4b) are adapted to receive therein two female fastener elements (20), respectively, as will be described.

Importantly, the seat back frame (3) should be embedded integrally in the foam padding (4), such that substantially an entirety of the second flange portion (3b) of each of the two lateral frame members (3B) thereof is exposed in a bore (4c) of the foam padding (4), with the hooked male engagement end portion (3d) thereof being also exposed in the recessed region (4Ba) which is in communication with the bore (4c), as best shown in FIG. 7. Note that the afore-said bore (4c) is naturally defined due to the opened side (at 3a and 3b) of the lateral frame member (3B) adjoining with that recessed region (4Ba) in the foam padding (4).

The seat back (SB) of the present invention is basically similar in structure to the previously described prior-art seat back (SB'), in that a plurality of separate cover materials are sewn together to provide the illustrated three-dimensional trim cover assembly (1) which includes: an openable rear central cover portion (11) defined substantially in a central area of the rear side (1A) thereof; and a pocket (P) provided to that rear central cover portion (11), and further in that the foam padding (4) is covered with the trim cover assembly (1), with a seat back frame (3) embedded integrally in the padding (4). As similar to the prior-art seat back (SB'), the openable rear cover portion (11) is, only at the upper end thereof, continuously connected with the trim cover assembly's rear side (1A) in an integral fashion and thus movable vertically relative to that upper end to thereby open and close a central area of the trim cover assembly's rear side (1A), which allows the foam padding (4) to be easily accessed to the inside of the trim cover assembly (1) and placed bodily therewithin. Of course, the pocket (P) is adapted to receive books and other articles therein.

In accordance with the present invention, the rear central cover portion (11) has a length substantially equal to a whole length of each of the two lateral frame members (3B) of seat back frame (3), and a pair of other rear cover portions (12) and (12) are arranged in the trim cover assembly's rear side (1A) so as to lie on the opposite sides of and symmetrically relative to the rear central cover portion (11). Specifically, as can be viewed from FIG. 2, a left rear cover portion (12) is formed integrally in the left-side rear region of trim cover assembly (1) so as to extend in a direction inwardly of the seat back's rear side (SBr). On the other hand, likewise, a right-side rear cover portion (12) is formed integrally in the right-side rear region of the trim cover assembly (1) so as to extend in a direction inwardly of the seat back's rear side (SBr). Both left and right rear cover portions (12) and (12) are also substantially equal in whole length to the two lateral frame members (3B), respectively. It is to be seen that each of those two rear cover portions (12) and (12) is foldable or movable in left- and right-wise directions toward and away from the rear central cover portion (11).

Hereinafter, for the sake of simplicity, the rear central cover portion (11) shall be referred to as "first rear cover portion (11)", and each of the two rear cover portions (12) shall be referred to as "second rear cover portion (12)".

As can be seen in FIG. 2, the two second rear cover portions (12) are each provided with a male fastener plate (30). The male fastener plate (30) per se is simply formed from an elongated flat plate of a hard synthetic resin material such as polyplopylene, which extends rectilinearly in the longitudinal direction thereof and to a length equal to a whole length of the second rear cover portion (12) as best shown in FIG. 2, it therefore follows that the male fastener plate (30) has a length substantially equal to a whole length of the lateral frame member (3B). Referring also to FIG. 4, it is observed that such male fastener plate (30) is sewn to and along a reverse side of free end portion (12*a*) of the second rear cover portion (12) and that one lateral end of the male faster plate (30) lies in alignment with a distal edge of the free end portion (12*a*).

Also in the present invention, fixedly sewn to and along the respective two lateral ends of the first rear cover portion (11) are a pair of anchor-type female fastener assemblies (7) and (7) (as best seen in FIG. 2) which cooperate with the afore-said two male fastener plates (30) and (30), respectively, to provide a novel fastener arrangement which allows both first and second rear cover portions (11) (12) to be neatly attached to the foam padding's rear side (4B), thereby rendering uniform and flat a whole of the rear side (1A) of trim cover assembly (1), without any irregularity or any meandering portion caused therein.

As clearly depicted in FIGS. 5 and 7, each of the two female fastener assemblies (7) and (7) is essentially composed of the following elements in an integral manner:

a securing base element (10) including two anchor portions (which will be set forth below) for embracing engagement with the aforementioned male engagement end portion (3*d*) of the seat back frame (3);

a female fastener element (20) which allows the afore-stated male fastener plate (30) to be securely engaged therewith; and a connecting element (40) connected between the securing base element (10) and the female fastener element (20).

It is noted that all the foregoing securing base element (10), female fastener element (20), and connecting element (40) are formed from a hard synthetic resin material, such as polyplopylene, and are substantially equal in whole length to the lateral frame member (3B) of seat back frame (3).

As shown, the securing base element (10) of each female fastener assembly (7) is formed in an elongated fashion extending in the longitudinal direction thereof and has a length substantially equal to a whole length of the lateral frame member (3B) or the second flange portion (3*b*) of that lateral frame member (3B). The securing base element (10) has, integrally formed therewith: a flat plate portion (10*c*); and a pair of first and second anchor portions (10*a*) and (10*b*) extending at right angle from that flat plate portion (10*c*), wherein each of the two anchor portions (10*a*) and (10*b*) is provided with a certain elastic property, while having its own rigidity of hard synthetic resin material. More specifically, as seen in FIG. 4, the first anchor portion (10*a*) is configured to have a substantially arrow-like hooked shape in cross-section and extends at a right angle from one end of the flat plate portion (10*c*). On the other hand, as viewed from the cross-section in FIG. 4, the second anchor portion (10*b*) extends below the first anchor portion (10*a*) from the flat plate portion (10*c*) and is formed. In an upturned fashion so as to become curved upwardly from the base portion thereof integral with the flat plate portion (10*c*) and terminate in a horizontally extending end region (10*b*E). As understandable from FIGS. 4, 6 and 7, both first and second anchor portions (10*a*) and (10*b*) extend along a whole length of the securing base element (10) and are spaced apart from each other to define a generally "U" shaped space therebetween. It is therefore seen that such generally "U" shaped space extends longitudinally along a whole length of the securing base element (10), with an elongated opening in communication with that space being defined between the two distal ends respectively of the first and second anchor portions (10*a*) and (10*b*). Such generally "U" shaped space substantially corresponds in shape to the previously stated gutter-like male engagement end portion (3*d*) of generally "U" shaped cross-section. Hence, as will be described, substantially an entirety of the male engagement end portion (3*d*) can be inserted in the afore-said elongated opening and then fit engaged in the afore-said generally "U" shaped space.

The female fastener element (20) is formed to have a generally "J" shape in cross-section and comprise: a flat base portion (20*a*); and a female engagement portion (20*b*). As shown, the female engagement portion (20*b*) is formed to extend curvilinearly in a hairpin manner from one end of the flat base portion (20*a*) and further extend in parallel with that flat base portion (20*a*) to terminate in a inwardly projected end portion (20*c*), with an access space defined between that projected end portion (20*c*) and the flat base portion (20*a*). With this structure, an inner space is surrounded or defined by the flat base portion (20*a*), the female engagement portion (20*b*) and the inwardly projected end portion (20*c*). In other words, the female engagement portion (20*b*) has, defined therein, such particular inner space and the afore-said access space which is in communication with that inner space. With such arrangement, as will be stated, both male fastener plate (30) and one end of the second cover portion (12) fixed thereto can be inserted through the access space and engaged fit in the inner space.

The connecting element (40) is formed in a generally L-shaped configuration having: a vertical flat portion (40*a*); a first folded connecting region (40*b*) defined integrally in one end area of that vertical flat portion (40*a*); and a second folded connecting portion (40*c*) extending horizontally or at right angle from the vertical flat portion (40*a*). As understandable from FIG. 7, formation of this connecting element (40) is such that, at first, a plate of hard synthetic resin material, such as polyplopylene, is bent at the central line thereof to define an L-shaped body having a first half and a second half, and then, one-third part of the first half is folded downwardly and juxtaposed on one planar surface of that particular first half, thereby defining the afore-said first folded connecting region (40*b*), whereas on the other hand, one-second part of the second half is folded and juxtaposed on the other one-second planar part of that particular second half, thereby defining the afore-said second folded connecting region (40*c*). Hence, it is seen that the first folded connecting region (40*b*) extends vertically on the upper, end area of the vertical flat portion (40*a*), while extending longitudinally along a whole length of the connecting element (40), whereas the second folded connecting region (40*c*) extends horizontally with respect to the first folded connecting region (40*b*), while extending longitudinally along the whole length of the connecting element (40), as well.

Figure 6:
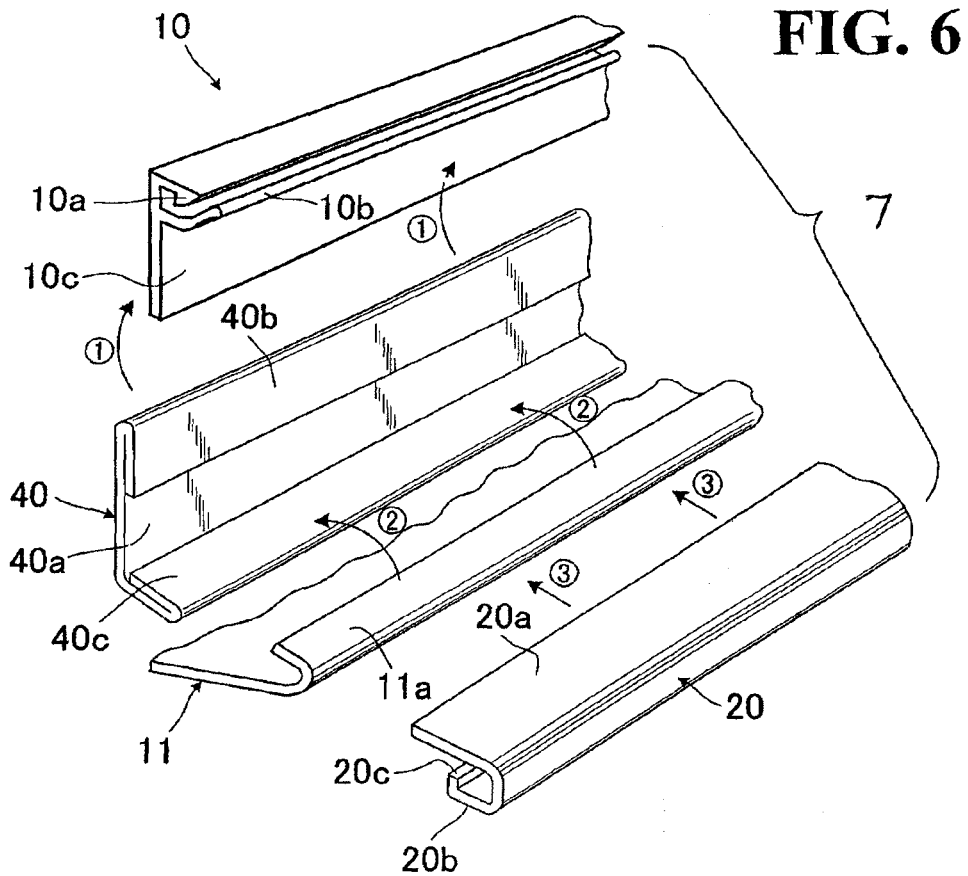
FIG. 6 is a partly-broken exploded perspective view of a female fastener assembly in accordance with the present invention.

Reference being now made to FIG. 6, a description will be made as to how the above-described securing base element (10), female fastener element (20) and connecting element (40) are put together to form the female fastener assembly (7), while connecting that female fastener assembly (7) with the lateral end of the first cover portion (11) at the same time. It is noted here that there are indeed a pair of the female fastener assemblies (7) and (7), as stated earlier, and therefore, each of the two female fastener assemblies (7) should be formed and connected with the corresponding one of the two lateral ends of the first cover portion (11), but, a description will be given with regard to only one female fastener assembly (7) and also to only one lateral end of the first rear cover portion (11), for the sake of simplicity.

First of all, as indicated by the arrows ①, one outer side of the flat plate portion (10c) of the securing base element (10), on which no two anchor portions (10a) and (10b) lie, is juxtaposed on and along the first folded end region (40b) of the connecting element (40). Then, sewing is effected to connect together those flat plate portion (10c) and vertical folded end region (40b). The resulting sewn connection can be viewed from FIGS. 4 and 7. Next, as indicated by the arrows ②, one lateral end region (11a) of the first cover portion (11) is folded over and placed on and along the second folded end region (40c) of the connecting element (40). Then, the flat base portion (20a) of the female fastener element (20) is juxtaposed upon and along the thus-placed lateral end region (11a) of first rear cover portion (11), as indicated by the arrows ③. Subsequent thereto, all those flat base portion (20a) and two end regions (11a) and (40c) are sewn together as shown in FIGS. 4 and 7. As a result thereof, one female fastener assembly (7) is formed, with the second folded end region (40c) thereof being fixedly sewn with the corresponding one lateral end region (11a) of first cover portion (11), as can be best seen in FIGS. 2 and 7.

Of course, the same steps as described above should also be effected to form the other female fastener assembly (7) and connect the same to the other lateral end region of the first rear cover portion (11), so that a pair of female fastener assemblies (7) and (7) are fixedly provided to the two lateral end regions of the first rear cover portion (11), respectively, as shown in FIG. 2.

With regard to the thus-formed female fastener assembly (7), a distance between the first anchor portion (10a) and the flat base portion (20a) should be equal to or slightly smaller than a thickness of a localized area of the foam padding (4) which is defined by the bore (4c), inner wall region (4a) and stepped portion (4b), as understandable from FIG. 4, which is important to attain one of the advantageous effects of the present invention, as will be stated later.

Now, a description will be made as to how the seat back (SB) is finished by means of the first rear cover portion (11) provided with the two female fastener assemblies (7) and the two second cover portions (12) each having the male fastener plate (30). In this regard, hereinafter, only the right-side area of the seat back (SB), such as the right-side lateral end region of the first rear cover portion (11), right-side female fastener assembly (7) and right-side second rear cover portions (12), will be described for the sake of simplicity, with reference to FIGS. 4, 5 and 7.

At first, when the first rear cover portion (11) is attached to the seat back's rear side (SBr), as understandable from FIG. 7 to FIG. 4 in sequence, the securing base element (10) is pressed against the male engagement end portion (3d) so that a whole of distal end of that male engagement end portion (3d) is first forcibly inserted in the elongated opening defined between two distal ends respectively of the first and second anchor portions (10a) and (10b). At this moment, the second anchor portion (10b) is placed in a stepped portion (4d) formed in the foam padding (4) in the vicinity of the male engagement end portion (3d) of the lateral frame member (3), which facilitates the ease with which two anchor portions (10a) (10b) are engaged with the male engagement end portion (3d). Then, an entirety of that male engagement end portion (3d) is forcibly fit engaged in the generally "U" shaped space defined between the first and second anchor portions (10a) and (10b). This forcible engagement can be easily done under a relatively small force, because both first and second anchor portions (10a) and (10b) are easily and resiliently movable away from each other to widen both elongated opening and generally "U" shaped space thereof to a degree enough to allow insertion of the male engagement end portion (3d) thereinto, and can also be automatically recovered into the respective original shapes thereof so that the entirety of male engagement end portion (3d) is sandwiched and retained tight between the two anchor portions (10a) and (10b). Consequently, as shown in FIG. 4, the two opposite sides (3d-1) and (3d-2) of the male engagement end portion (3d) are closely contacted with the first and second anchor portions (10a) and (10b), respectively, and further, the horizontally extending end region (10bE) of the second anchor portion (10b) is in close contact with the second flange portion (3b) of the lateral frame member (3B). It is therefore to be appreciated that the securing base element (10) is fixedly secured to the lateral frame member (3B) against movement in any direction.

During such attachment of the securing base element (10) to the lateral frame member (3B), the female fastener element (20) is automatically placed in close contact with the stepped portion (4b) of the foam padding (4), while the flat plate portion (10c) of the securing base element (10) also closely contacts the inner wall region (4a) of the foam padding (4). Thus, the right-side female fastener assembly (7) is securely attached in position to the right-side rear area of the foam padding (4), while the right-side lateral end region of the first rear cover portion (11) is also securely retained in position on the right-side rear area of the seat back (SB), as shown in FIG. 4. In this regard, it is observed that an elongated opening (L) is defined between and along the folded end region (11a) of the first rear cover portion (11) and the projected end portion (20c) of the female fastener element (20), as can be seen in FIG. 4. This elongated opening (L) is so dimensioned as to be substantially equal to or slightly larger than a thickness of juxtaposition of the male fastener plate (30) and second cover portion's end region (12a) in order that both the male fastener plate (30) and the end region (12a) can be inserted through the elongated opening (L).

Next, in a manner similar to the above-described steps, the left-side female fastener assembly (7) is securely attached in position to the left-side rear area of the foam padding (4), while the left-side lateral end region of the first rear cover portion (11) is also securely retained in position on the left-side rear area of the seat back (SB), although not shown.

At this stage, it is to be appreciated that the first rear cover portion (11) is easily and neatly secured to the foam padding's rear region (4B) in position, with neither crease nor irregularity caused in the first cover portion (11) per se, as can be best seen in FIG. 3, owing to the fact that the securing base element (10) of the female fastener assembly (7) is positively connected to and retained by the lateral frame member (3) against movement via the first and second anchor portions (10a) and (10b), as described previously.

Finally, as understandable from FIG. 4 to FIG. 5 in sequence, both end region (12a) of right-side second rear cover portion (12) and male fastener plate (30) sewn thereto (or a lamination of these the end region (12a) and the male fastener plate (30) are inserted through the elongated opening (L) defined between the folded end portion (11a) of the first rear cover portion (11) and the projected end portion (20c) of the female fastener element (20), and then placed in the inner space of the female fastener element (20), as shown in FIG. 5, such that the male fastener plate (30) is engaged with and retained by the projected end region (20c) of the female fastener element (20) against movement. Accordingly, the right-side second rear cover portion (12) is securely and neatly attached to the right-side rear area of seat back (SB), without any crease or irregularity caused therein, so as to extend along and abreast of the right-side lateral end of the first rear cover portion (11), as, can be best seen in FIG. 3. Although not shown, as for the other left-side second rear cover portion (12), the same steps as described are effected, so that the left-side second rear cover portion (12) is securely attached to the left-side rear area of seat back, as shown in FIG. 3. As a result thereof, all of the first and second rear cover portions (11') and (12) are neatly secured to the seat back's rear side, as shown in FIG. 3.

In accordance with the present invention, therefore, it is to be appreciated that the following effects and advantages are achieved:

(i) Even when a passenger strongly pulls the pocket (P) fixedly provided to the first rear cover portion (11) or inserts a large book or a plurality of books or articles in that pocket, neither deformation nor irregularity is created in the mutually engaged male and female fastener portions (30 and 20), because the corresponding great outward force applied to the pocket (P) is directly transmitted to and dispersed in the two rigid lateral frame members (3B) and (3B) through the respective two female fastener assemblies (7) each including the first and second anchor portions (10a) and (10b) engaged with the male engagement end portion (3d) of the lateral frame member (3B). Hence, most of the great force is dispersed into the two rigid lateral frame members (3B), so that the mutually engaged male and female fastener portions (30 and 20) do not receive the great force intensively and are therefore reliably protected against deformation. This in turn insures the prevention of creases, slack portions and irregularities on the surfaces of the first and second cover portions (11) (12), hence maintaining an aesthetic appearance of the seat back's rear side.

(ii) The securing base element (10), connecting element (40) and female fastener element (20) are so arranged as to define therein a space of substantially channel cross-section, as can be seen in FIG. 4. It is seen that such space accommodates and retains a localized area of the foam padding (4) which is defined by the bore (4c), inner wall region (4a) and stepped portion (4b). In particular, the flat plate portion (10c) of the securing base element (10) contacts most of the inner wall region (4a) of the foam padding (4), while both the vertical plate portion (40a) and the first folded end region (40b) of the connecting element (40) are abutted against a whole of such inner wall region (4a). In fact, such inner wall region (4a) and the adjacent areas of the foam padding (4) are easily stretchable or movable towards the recessed region (4Ba) due to the elastic and soft property thereof. But, the flat plate portion (10c), which is positively secured via the two anchor portions (10a) and (10b) to the lateral frame member (3B) and which is unmoved, and the vertical plate portion (40a) of the connecting element 40 cooperate with each other to insure the prevention of such movement of the inner wall region (4a) and the adjacent areas of the foam padding (4). Therefore, both of the connecting element (40) and the female fastener element (20) are assuredly protected against dislocation due to the movability of foam padding (4), thereby insuring not only keeping the first rear cover portion (11) in a uniformly stretched state, without creation of irregularity and crease on the surface thereof, but also retaining the female fastener element (20) at a predetermined position, so that the male fastener plate (30) can be smoothly and precisely engaged in and along with female fastener element (20).

While having described the present invention thus far, it is to be understood that the invention is not limited to the illustrated embodiment, but any modification, addition and replacement may be applied thereto, without departing from the scope of the appended claims.

What is claimed is:

1. An arrangement of trim cover assembly to a seat back, said seat back including a rear side facing backwardly thereof and comprising:
   a foam padding formed in a shape that substantially conforms to an outer contour of the seat back, said foam padding including a rear side corresponding to said rear side of the seat back;
   a seat back frame provided in said foam padding, said seat back frame being rigid and including a pair of rigid lateral frame portions; and
   said trim cover assembly formed in a three-dimensional shape that substantially conforms to said shape of said foam padding, said trim cover assembly covering said foam padding, wherein said trim cover assembly includes:
   a rear side corresponding to said rear side of the seat back;
   a first cover portion defined in said rear side of the trim cover assembly, such that one end of said first cover portion is only integral with the rear side of said trim cover assembly so that the first cover portion is movable relative to said one end in a direction toward and away from said rear side of said foam padding, said first cover portion having a pair of lateral end regions; and
   a pair of second cover portions defined in said rear side of the trim cover assembly and positioned symmetrically relative to said first cover portion;
   wherein one of said pair of second cover portions includes a free end region, while the other of said pair of second cover portions also includes a free end region, such that said two free end regions of said pair of second cover portions are spaced apart from each other relative to said first cover portion, while facing toward each other and extending substantially along a whole length of both said pair of lateral frame portions of said seat back frame;
   a pair of male fastener elements are respectively provided to and along said free end regions respectively of said pair of second cover portions; and
   a pair of female fastener assemblies are respectively provided to and along said two lateral end regions of said first cover portion, each female fastener assembly of said pair of female fastener assemblies including an anchor element and a female fastener element,
   wherein said anchor element is securely engaged with and along each of said pair of lateral frame portions of said seat back frame, and said male fastener element is securely engaged with and along said female fastener element, so that said pair of female fastener assemblies are connected, via the anchor elements thereof, to said pair of lateral frame portions, respectively, and said first cover portion is securely attached to said rear side of said foam padding, while said pair of second cover portions are also securely attached to said rear side of said foam padding, with said free end regions of said pair of second cover portions adjoining with and along, respectively, said two lateral end regions of said first cover portion.

2. The arrangement of trim cover assembly as claimed in claim 1, wherein said first cover portion has a pocket provided therewith.

3. The arrangement or trim cover assembly as claimed in claim 1, wherein said pair of male fastener elements are each formed from a hard synthetic resin material which is amenable to sewing,
   wherein said pair of male fastener elements are connected by sewing to and along said free end regions respectively of said pair of second cover portions, wherein said pair of female fastener assemblies are each formed from a hard synthetic resin material amenable to sewing, and wherein said pair of female fastener assemblies are connected by sewing to and along said two lateral end regions of said first cover portion, respectively.

4. The arrangement of trim cover assembly as claimed in claim 1, wherein each member of said pair of rigid lateral frame portions of said rigid seat back frame has a channel cross-section including a pair of flange portions which extend along said pair of lateral frame portions, respectively, wherein one of said pair of flange portions includes a free end region, and wherein said anchor element is of such a configuration and property that allows said free end region of said one of said pair of flange portions to be inserted therein and securely engaged therewith.

5. The arrangement of trim cover assembly as claimed in claim 4, wherein said free end region of said one of said pair of flange portions is formed in a generally "U" shape in cross-section to provide a generally "U" shaped end region, wherein each female fastener assembly of said pair of female fastener assemblies includes a securing base element configured to be securely engaged with said generally "U" shaped end region, said securing base element having, defined therein, a plate portion and said anchor element in an integral manner, wherein said anchor element comprises a pair of first and second anchor portions which are so formed to define a generally "U" shaped space therebetween, said generally "U" shaped space substantially corresponding in shape to said generally "U" shaped end region of said one of said pair of flange portions, wherein said generally "U" shaped end region is inserted and engaged to fit in said generally "U" shaped space, so that said securing base element is securely connected with said one of said pair of flange portions associated with said rigid seat back frame, thereby being prevented against movement, wherein said foam padding includes an inner wall therein, and wherein said plate portion of said securing base element is in contact with said inner wall.

6. The arrangement of trim cover assembly as claimed in claim 5, wherein each female fastener assembly of said pair of female fastener assemblies, inclusive of the plate portion thereof and the first and second anchor portions thereof, is formed from a hard synthetic resin material amenable to sewing, and wherein said plate portions of said pair of female fastener assemblies are connected by sewing to and along said two lateral end regions of said first cover portion, respectively.

7. The arrangement of trim cover assembly as claimed in claim 1, wherein said pair of male fastener elements each comprises a male fastener plate fixedly provided to and along said free end region of each of said pair of second cover portions, wherein said female fastener element associated with each of said pair of female fastener assemblies is of a generally "J" shaped cross-section comprising:

a flat base portion; and a female engagement portion which extends curvilinearly in a hairpin fashion from one end of said flat base portion and further extends in a substantially parallel relation with said flat base portion to terminate in a projected end portion which faces towards said flat base portion, while being spaced apart therefrom, and said female fastener element comprises:

an opening defined between the projected end portion and said flat base portion; and an inner space defined by said flat base portion, said female engagement portion and said projected end portion, wherein both of said free end region of said second cover portion and said male fastener element provided therewith are inserted through said opening and securely engaged in said inner space, so that said pair of second cover portions are securely attached in position to said rear side of said foam padding, with said free end regions respectively thereof adjoining with and along said two lateral end regions of said first cover portion, respectively, and wherein said flat base portion of said female fastener element is in close contact with an outer surface of said rear side of said foam padding.

8. The arrangement of trim cover assembly as claimed in claim 1, wherein each female fastener assembly of said pair of female fastener assemblies includes a securing base element configured to be securely engaged with one of said pair of lateral frame portions, said securing base element including, defined therein, a plate portion and said anchor element in an integral manner, wherein each female fastener assembly of said pair of female fastener assemblies further includes a connecting element, wherein said plate portion of said securing base element and said female fastener element are connected together via said connecting element, and wherein each of said securing base element, said female fastener element and said connecting element has a length substantially equal to a whole length of each of said pair of lateral frame portions.

9. The arrangement of trim cover assembly as claimed in claim 8, wherein each female fastener assembly of said pair of female fastener assemblies, inclusive of the plate portion thereof, the anchor portion thereof, the female anchor element thereof and the connecting element thereof, is formed from a hard synthetic resin material amenable to sewing, and wherein said plate portion is connected by sewing to said connecting element, and said female anchor element is connected by sewing to said connecting element.

10. The arrangement of trim cover assembly as claimed in claim 1, wherein said rear side of said foam padding includes:

an outer surface; and a region defined therein adjacent to each of said pair of lateral frame portions, wherein each female fastener assembly of said pair of female fastener assemblies includes:

a securing base element to be securely engaged with one frame portion of said pair of lateral frame portions, said securing base element including, defined therein, a plate portion and said anchor element in an integral manner, said plate portion being in close contact with said region of said rear side of said foam padding, wherein each female fastener assembly of said pair of female fastener assemblies further includes a connecting element having a first portion and a second portion, wherein said first portion is connected with said plate portion of said securing base element, while being abutted against said region of said rear side of said foam padding, and wherein said second portion is connected with said female fastener element, while being abutted against said outer surface of said rear side of said foam padding.

11. The arrangement of trim cover assembly as claimed in claim 1, wherein said pair of female fastener assemblies are formed from a hard synthetic resin material amenable to sewing and are connected by sewing to and along said two lateral end regions of said first cover portion, respectively.

* * * * *